United States Patent Office 3,018,263
Patented Jan. 23, 1962

3,018,263
PROCESS FOR THE MANUFACTURE OF LOW BRITTLE POINT POLYPROPYLENE COMPOSITIONS
Abraham Schneider, Overbrook, Hills, Pa., assignor to Sun Oil Company, Philadelphia, Pa., a corporation of New Jersey
No Drawing. Filed Nov. 14, 1957, Ser. No. 696,330
6 Claims. (Cl. 260—45.5)

This invention relates to methods for preparing polypropylene compositions and more particularly to methods for preparing compositions of predominantly crystalline polypropylene blended with polymers of other olefins.

Propylene has heretofore been polymerized to relatively low molecular weight liquids or to soft amorphous solids through the use of catalysts such as aluminum trichloride and the like. Propylene can be polymerized to relatively high molecular weight solid polymers by contacting propylene with a catalyst such as titanium trichloride and an activator such as aluminum triethyl maintained in an inert, liquid reaction medium. Generally such processes produce propylene polymers having a molecular weight of above 5000 and usually within the range of from 50,000 to 500,000. A major proportion of the polymer prepared in this manner is crystalline, i.e., exhibits a crystalline structure by X-ray analysis. The crystalline polymer is relatively insoluble in the usual hydrocarbon solvents such as heptane and isooctane, except at high temperatures. This insolubility provides a means of separating the crystalline polymer from amorphous polymers which are also formed in the above-described reaction, since the amorphous polymers are quite soluble in such hydrocarbons. The crystalline polymers of propylene, hereinafter designated as polypropylene, possess many desirable properties, such as high yield strengths of 3500 to 4000 p.s.i. (pounds per square inch) as determined by ASTM Test No. D 638–56T, but they are not suitable for use in many applications because of their high brittle points, which is usually from about 10° C. to 20° C. By "brittle point" is meant the temperature at which the polymer exhibits brittle failure under specific impact conditions as measured by ASTM Test D 746–52T. For example, molded articles made from such polymers are too brittle for use in some applications even at room temperature.

A number of plasticizers have been proposed for lowering the brittle point of polypropylene, but none of these has been entirely satisfactory because such plasticizers also tend to lower the tensile strength or to adversely affect other properties of the polypropylene. Other polymers have been used to some extent as plasticizers for polypropylene, but it has been found that these polymers are incompatible with polypropylene when blended by the usual methods, such as by dissolving polypropylene and the other polymer in a solvent and precipitating them together. The methods previously used resulted in a composition of very low strength due to nonhomogeneous blending of the two materials.

It is, therefore, an object of this invention to provide a method whereby new polypropylene compositions may be prepared. It is another object to provide a method whereby polypropylene is homogeneously blended with minor proportions of another polymer. Other objects and their achievement will become apparent hereinafter.

It has now been found that polypropylene compositions having a low brittle point can be prepared by melting together polypropylene and a minor proportion of a different polymer, mechanically working the molten polymers to obtain a homogeneous mixture and shock cooling the mixture to preserve its homogeneity. By "shock cooling" is meant rapid cooling so that the polypropylene composition is converted from a molten state to a solid state in not more than about 10 minutes and preferably not more than 7 minutes. The shock cooling should involve cooling the composition from a temperature of from 160° C. to 200° C., that is, from above the melting point of polypropylene, to a temperature of no greater than 100° C., and preferably to a temperature of below 70° C., within the time stated. Such shock cooling may be accomplished by any convenient means such as, for example, extruding the polypropylene composition into a cold, inert refrigerant, or mixing the molten material with a refrigerant. The process may advantageously be applied in the production of finished products, such as by extrusion or molding, so as to prevent the possibility of any separation of the blended materials if the composition is first prepared by this process and then reheated for forming into finished products.

In accordance with the invention, crystalline polypropylene and a minor proportion of another polymer, usually from about 5% to about 25%, are heated together to a temperature above the melting point of the higher melting material. Temperatures up to 30° C. above the melting point of the higher melting material may be used. Usually the higher melting material will be polypropylene. The polymers used for practicing this invention may be polyethylene, amorphous polypropylene, polystyrene, and polymers of aliphatic olefins having from 4 to 8 carbon atoms. For example, polymers of isobutylene, butene-1, butene-2, styrene, 1,3-butadiene, 3-methyl butene-1, pentene-1, and copolymers thereof are suitable materials. Either normally liquid or normally solid polymers may be used. When heated above the melting point of polypropylene, mixtures of 5% to 25% of these materials in polypropylene are viscous pastes which can be mechanically worked. The mechanical working may consist of kneading, stretching, folding, compressing, etc., and is continued for a period sufficient to insure that the materials are thoroughly homogenized. The blended composition may then be shock cooled, as by extruding slender rods into a cold inert refrigerant, or by otherwise mixing, such as by spraying, with a refrigerant. The cooling must be very rapid in order to maintain the homogeneity of the composition.

Polypropylene compositions prepared as above described have a brittle point of not more than —5° C., and brittle points of below —20° C. are frequently obtained. The other physical properties of the composition are not substantially different from those of the crystalline polypropylene used. For example, the composition will usually have a yield strength in tension of from 3500 p.s.i. to 4000 p.s.i., and a melting point of from about 160° C. to 170° C.

The following example illustrates the process of the invention. In the example, "parts" refers to parts by weight unless otherwise indicated:

Polypropylene having an average molecular weight of 111,000, a yield strength in tension of 3800 p.s.i., and a melting point of 165° C. was determined to have a brittle point of 13° C. 90 parts of this polypropylene are added to 10 parts of polyethylene having a melting point of 115° C. The materials are ground together to a fine powder and heated to a temperature of 180° C. At this temperature the mixture has the consistency of a very viscous paste. The materials are then kneaded between two rollers revolving at different speeds for a period of 30 minutes and then extruded as a ¼ inch diameter rod under a pressure of 10,000 p.s.i.g. (pounds per square inch gauge) into a bath of propane maintained at a temperature of 0° C. The composition is thereby cooled almost instantly to a flexible solid. This material is found to have a melting point of 162° C. and a brittle point of below about —10° C.

Repeating the above process, using varying amounts of polyethylene, from 5% to 25%, and with amorphous polypropylene, polyisobutylene, polybutene-1 and polybutene-2 in the same range of proportions, a composition is obtained which has a brittle point below −5° C. and other physical properties substantially the same as those of the crystalline polypropylene used in the process.

The following example demonstrates that equivalent results cannot be obtained by other blending methods:

Polypropylene and polyethylene with properties as described in the previous example were dissolved together, in a proportion of 90 parts polypropylene and 10 parts polyethylene, in a n-septane at 155° C. The solvent was then evaporated off, leaving a blend of polypropylene and polyethylene. This blended material had a brittle point of 1° C., and a melting point of 155° C.

Additional blends made by melting polypropylene and another polymer, mechanically working the molten material, and air cooling, resulted in compositions of very low strength, apparently due to the fact that the two materials did not remain homogeneously dispersed in each other. Films made from blends had "fish eyes," or spots of polymer which were not dispersed.

The invention claimed is:

1. A process for preparing polypropylene compositions having a brittle point of not more than about −5° C. which comprises melting together, at a temperature up to 30° C. above the melting point of the higher melting material, crystalline polypropylene and from 5% to 25% by weight of a different polymer selected from the group consisting of polymers of aliphatic olefins having from 4 to 8 carbon atoms, polystyrene, polyethylene, and amorphous polypropylene, mechanically working the molten polymer mixture whereby a substantially homogeneous blend is obtained, and shock cooling the blend to a temperature of not greater than 100° C. in a time not exceeding 10 minutes, whereby the homogeneity of the blend is preserved.

2. The process of claim 1 wherein the polymer selected is polyethylene.

3. The process of claim 1 wherein the polymer selected is amorphous polypropylene.

4. The process of claim 1 wherein the polymer selected is polybutene-1.

5. The process of claim 1 wherein the polymer selected is polybutadiene.

6. The process of claim 1 wherein the polymer selected is polybutene-2.

References Cited in the file of this patent

UNITED STATES PATENTS

| | | |
|---|---|---|
| 2,581,922 | Spencer | Jan. 8, 1952 |
| 2,677,000 | Russum | Apr. 27, 1954 |
| 2,691,647 | Field et al. | Oct. 12, 1954 |

FOREIGN PATENTS

| | | |
|---|---|---|
| 503,973 | Canada | June 29, 1954 |

OTHER REFERENCES

Leaderman: "Elastic and Creep Properties of Filamentous Materials and Other High Polymers," The Textile Foundation (1943), pages 90–94 and 98–101 relied on.